Dec. 2, 1941.   E. H. CLARK   2,264,296
BULLET HOLE GAUGE
Filed June 6, 1940
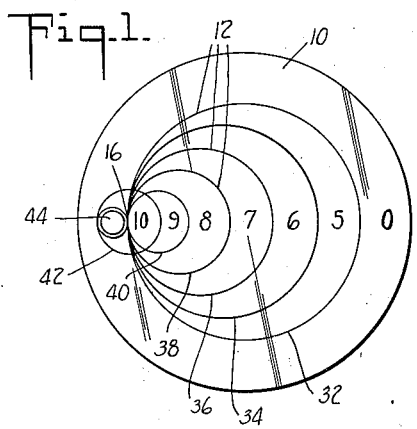
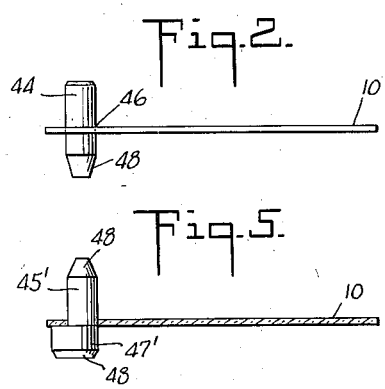
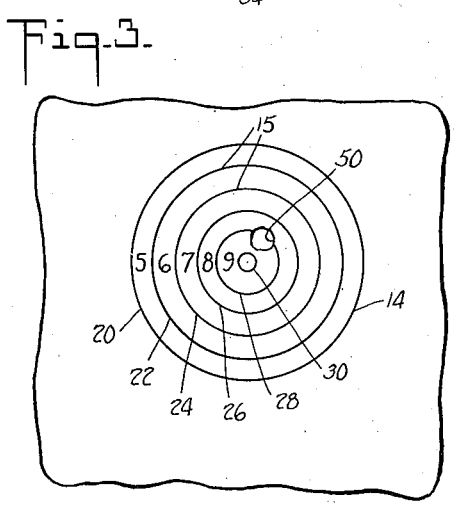
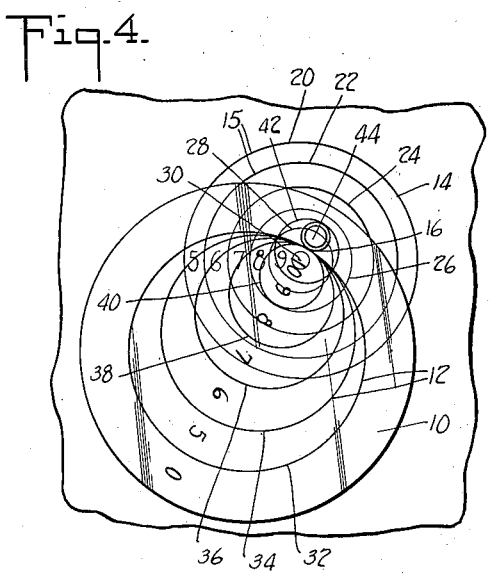
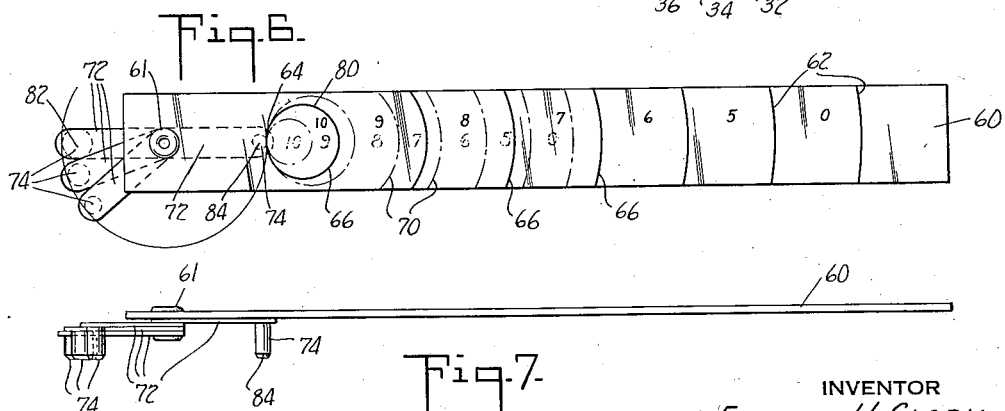
INVENTOR
EVERETT H. CLARK
BY
Dyke and Schaines
ATTORNEYS Patented Dec. 2, 1941

2,264,296

UNITED STATES PATENT OFFICE 2,264,296

BULLET HOLE GAUGE

Everett H. Clark, New York, N. Y.

Application June 6, 1940, Serial No. 339,061

9 Claims. (Cl. 33—174)

My invention relates to improvements in gauges for determining the exact scoring position of bullet holes in rifle, pistol, and small bore target shooting matches. The main object of my invention is the provision of a gauge which will determine the precise scoring position of a bullet hole on the target. Another object of my invention is the provision of a guage which may be used for measuring the relative position of bullet holes of different calibers, and for use on differently sized targets. Additional objects will in part be obvious and in part pointed out hereinafter in connection with the description of several illustrative embodiments.

Broadly speaking, my device comprises a member of flat transparent material adapted to be placed directly over the target to be measured. A pin or plug, the thickness of which is equal that of the particular size of bullet used, mounted in my device, is inserted through the bullet hole to be measured, and the device rotated about the pin or plug until certain lines on my device are positioned with respect to the score lines, or other indicia on the target, whereupon the precise scoring position of the bullet hole will be readily apparent.

In the drawing annexed hereto forming a part hereof:

Figure 1 is a plan view of one form of gauge constructed according to and embodying my invention;

Fig. 2 is a central cross-section thereof;

Fig. 3 is a plan view of a conventional target having a bullet hole therein;

Fig. 4 is a plan view of the form of gauge of Fig. 1, in measuring position on a target as in Fig. 3;

Fig. 5 is a cross-sectional view, corresponding to Fig. 2, of a modified form of gauge also constructed according to and embodying my invention; and Figs. 6 and 7 are views corresponding to Figs. 1 and 2 of another form of gauge also constructed according to and embodying my invention.

Most targets comprise a sheet of paper, or the like, on which is printed or otherwise formed a number of concentric circles of different sizes, the position of the bullet hole within one or another of these circles determining the scoring value of the shot. In the conventional form of target 14 illustrated in Fig. 3, the circles 15 are concentrically disposed; the largest and outermost circle 20 is known as the "5" circle, and all shots on or within this "5" circle and the next circle 22 being scored as five in target shooting. The next or second circle 22 is known as the "6" circle; the third circle 24 as the "7" circle; the fourth circle 26 as the "8" circle; the fifth circle 28 as the "9" circle; and the smallest innermost circle 30 as the "10" circle.

The gauge of Figs. 1, 2, 4 and 5, adapted to be used with target 14, is referred to generally by reference numeral 10. Gauge 10 may be circular in shape, but not necessarily so, and is preferably formed, as by stamping or otherwise, of a flat-lying rigid transparent material. Targets are more or less standardized as to size and as to the number and spacing of the circles thereon, and on one side of my gauge 10, I provide a plurality of circles 12 by scoring, stamping or by otherwise impressing same upon the body of disc 10. These circles 12 are of various sizes and conform in number and size to the circles 15 on the standard target 14 of Fig. 3. Circles 12, however, are so formed on my gauge and so located with respect to one another as to be tangent at one point 16, with but a single exception. On gauge 10, I define five circles 12, all of which are tangent at 16, as in Fig. 1, whereas there are six circles 15 on target 14.

The outermost circle 32 on my gauge, corresponding in size to circle 20 on target 14, is the "5" circle and is marked with such number; the second circle 34 is the "6" circle and corresponds to circle 22 on the target; the third circle 36 is the "7" circle; the fourth circle 38 is the "8" circle; and the innermost circle 40 is the "9" circle. With the point of tangency 16 of circles 12, 12 as the center, I form a sixth circle 42, of diameter equal to the thickness of the particular caliber bullet with which gauge 10 and target 14 are adapted to be used. Circle 42 is the "10" circle on my target and is also marked as such along the circles 32, 34, 36, 38 and 40. This is the exception noted above. As seen in Figs. 1 and 3, it will be obvious that for targets used with larger or smaller caliber bullets my gauge will have to be provided with larger or smaller circles corresponding to the sizes of the circles on the particular target used.

I provide a circular plug 44, of any suitable material, and insert same through a circular opening 46 formed within "10" circle 42 on my gauge 10. Plug 44 and circular opening 46 are equal in diameter to the thickness of the bullets being used, and opening 46 is formed within that portion of circle 42 outside the perimeter of circle 32 and tangent to that circle. Plug 44 is tapered at one end 48 for easy insertion within the target when placed thereon during use. When plug 44 is inserted within opening 46 it is also tangent to the circles 12.

My device is used in the following manner: Referring to Figs. 3 and 4, target 14 has a bullet hole 50 therein. This hole 50 is obviously on the line of the "9" circle 28, and will be scored as nine in computing the final total. To check this, however, and in measuring the scoring position of any bullet hole, my gauge 10 is placed over target 14, as in Fig. 4, and the tapered end 48 of plug 44 is inserted within the bullet hole 50. Plug 44 is equal in diameter to the diameter of the bullet used, as above stated, and the plug will entirely fill the opening. Disc 10 is then rotated about until the larger portion thereof with the tangent circles thereon overlies the side of the target opposite the bullet hole, and the imaginary line (the line may actually be drawn on the gauge) passing through the centers of circles 12, 12 also passes through the center of the target. Referring to Fig. 4, it will be seen that the "9" circle 28 of the target comes within the "9" circle 40 on my gauge 10, so that the bullet hole 50 is within the "9" circle on the target, and is scored as nine. The thinness of lines 12 and 15 makes it possible to get a hair line reading on the exact location of bullet holes. Were the bullet hole so placed that the "9" circle 28 fell outside the "9" circle 40 on the gauge, the shot would be scored as eight, and in like manner the scoring value of any bullet hole is easily, quickly and accurately determined with hair line precision. The lines of concentric circles 12 are formed on that side of the gauge which contacts the target, when in use, so that any possibility of error due to the thickness of gauge 10 is eliminated.

In Fig. 5, I have shown a modification of the form of gauge shown in Figs. 1, 2 and 4. In this modification two different sets of circles are defined on the disc on each side thereof, and the plug 44 is formed with a cylindrical stem 45' of one thickness on one side of the body of gauge 10, and with a cylindrical stem 47' of another and greater thickness on the other side of the gauge. This form of gauge may be used on the one target for measuring holes of bullets of two different calibers, corresponding respectively in thickness to the two thicknesses of stems 45' and 47' or on two targets having different sets of scoring circles thereon.

The modification of Figs. 6 and 7 is used in the identical manner. In this form of my invention, however, gauge 60 comprises a rectangular, elongated strip of transparent material having a plurality of arcs 62, 62 stamped or otherwise formed thereon. These arcs 62, 62 are parts of circles of different diameters, all of which circles, however, are tangent at one point, as at 64. Arcs 62, 62 correspond to the circles of one size of target and are shown by the full lines 66 on Fig. 6. A second set of arcs 70, 70 corresponding to the circles of a different size of target may also be provided on strip 60, as shown in dotted lines in Fig. 6. I have used, for illustrative purposes, full and dotted lines, but in practice I may distinguish the circles of the different sets 66 and 70 by defining same in different colors. I have shown but two different sets, but three or even more may be placed on my gauge. I provide a plurality of arms 72, and pivotally mount same on disc 60 as by means of rivet 61. Each arm 72 has a plug 74 of different thickness inserted therewithin. Plugs 74 are so mounted within arms 72 that their outer margins are tangent to circles 66 and 70 at their point of tangency 64. Thus, when disc 60 is used on a target with circles corresponding to circles 66, that arm 72 carrying plug 74 is pivoted into position tangent to the innermost circle of circles 66 in which the thickness of plug 74 is equal to the radius of circle 80. In that instance, it would be plug 82 instead of plug 84, as shown in Figs. 6 and 7. It is obvious that numerous other modifications may be made of my invention without departing from the essence thereof, and my invention is not to be limited except in accordance with the annexed claims.

Having described my invention, what I claim and desire to secure by Letters Patent is:

1. A gauge comprising a member of transparent material having defined thereon a plurality of circles of different sizes, all of which circles are tangent to each other.

2. A gauge comprising a member of transparent material having defined thereon a plurality of arcs of circles of different sizes, all of which circles are tangent to each other.

3. A gauge comprising a member of transparent material having defined thereon a plurality of circles of different sizes, all of which circles are tangent to each other, and having thereon additionally a circle of diameter larger than that of the smallest of the tangent circles, said additional circle being defined on the member with the point of tangency as its center.

4. A gauge as in claim 3 in which the member has a circular opening thereon of diameter equal to the radius of the additional circle.

5. A gauge as in claim 3 in which the member has a circular opening therein of diameter equal to the radius of the additional circle, the opening being outside of and tangent to the tangent circles at the point of tangency thereof.

6. A gauge comprising a circular member of relatively thin and fairly rigid transparent material having defined thereon by fine lines a plurality of circles of different sizes, which circles are tangent to each other, and having an additional circle defined thereon by similar fine lines, the additional circle having the point of tangency as its center, said member having a circular plug mounted thereon normal to the plane thereof.

7. A gauge as in claim 6 in which the circular plug is mounted on the member without and tangent to the tangent circles at the point of tangency thereof.

8. A gauge as in claim 6 in which the circular plug is mounted on the member within the additional circle, and is disposed without and tangent to the tangent circles at the point of tangency thereof.

9. A device of the character described comprising a thin, flat member of transparent material having defined thereon a plurality of arcs of circles of different sizes, said circles being tangent to each other, said sheet having mounted thereon a plug, and means to bring said plug into operative relation to said circles at the point of tangency.

EVERETT H. CLARK.